US008402379B2

(12) United States Patent  (10) Patent No.: US 8,402,379 B2
Barak  (45) Date of Patent: Mar. 19, 2013

(54) DYNAMIC CONTENT LAYOUT FOR A USER INTERFACE DISPLAY

(75) Inventor: Matan Barak, Ra'anana (IL)

(73) Assignee: SAP Portals Israel Limited, Ra'Anana (IL)

( * ) Notice: Subject to any disclaimer, the term of this patent is extended or adjusted under 35 U.S.C. 154(b) by 840 days.

(21) Appl. No.: 12/570,201

(22) Filed: Sep. 30, 2009

(65) Prior Publication Data

US 2011/0078598 A1    Mar. 31, 2011

(51) Int. Cl.
*G06F 3/00* (2006.01)
*G06F 9/00* (2006.01)
*G06F 17/00* (2006.01)

(52) U.S. Cl. ......... 715/762; 715/763; 715/764; 715/765

(58) Field of Classification Search .................. 715/762, 715/763, 764, 765, 864, 865, 866, 799, 800 715/801, 802, 803, 804, 806
See application file for complete search history.

(56) References Cited

U.S. PATENT DOCUMENTS

| | | | |
|---|---|---|---|
| 6,603,493 B1 * | 8/2003 | Lovell et al. ................... | 715/800 |
| 2004/0225960 A1 * | 11/2004 | Parikh et al. ................... | 715/517 |
| 2006/0069808 A1 * | 3/2006 | Mitchell et al. ............... | 709/246 |
| 2008/0052637 A1 * | 2/2008 | Ben-Yoseph et al. ......... | 715/800 |

* cited by examiner

*Primary Examiner* — Kieu Vu
*Assistant Examiner* — Anita D Chaudhuri
(74) *Attorney, Agent, or Firm* — Buckley, Maschoff & Talwalkar LLC (57) ABSTRACT

According to some embodiments, an ordered set of display elements may be determined for a user interface display, each display element being associated with a display value. A dynamic display table may be created for the display page, with each cell in the dynamic display table representing a sub-set of the display elements and containing a total of the display values of the display elements in that sub-set. An overall display value may be determined for the user interface page, and a plurality of cells in the dynamic display table may be evaluated to select an appropriate sub-set of display elements based on the overall display value. It may then be arranged for the selected sub-set of display elements to be presented on the user interface display.

15 Claims, 9 Drawing Sheets

|   | A | B | C | D | E | F |
|---|---|---|---|---|---|---|
| A | 10 |  |  |  |  |  |
| B | 30 | 20 |  |  |  |  |
| C | 60 | 50 | 30 |  |  |  |
| D | 72 | 62 | 42 | 12 |  |  |
| E | 95 | 85 | 65 | 35 | 23 |  |
| F | 110 | 100 | 80 | 50 | 38 | 15 |

DYNAMIC CONTENT LAYOUT FOR A USER INTERFACE DISPLAY

FIELD

Some embodiments of the present invention relate to user interface displays. In particular, some embodiments may comprise systems and methods wherein content layout is performed dynamically for a user interface display.

BACKGROUND

In some cases, a user interface display will include multiple display elements or objects. For example, a web page might include a horizontal series of "tabs" that can be selected by a user (and, upon selection, may result in a new or modified web page being displayed). Note that the overall size of a user interface display might vary. For example, a user might reduce the overall size of a web browser window (or of a frame within a web page). As a result, it might not be possible to include all of the display elements on the newly re-sized display. That is, some of the display elements will be "cut off" or exist outside the newly re-sized display.

A web browser application could calculate, at run time, which display elements should currently be included on a display. This, however, can be a complex determination that needs to be performed continuously. As a result, the performance of a system can be significantly reduced. As another approach, a web browser application might perform the work of rending all display elements, including even those that will not be visible in the current user interface display area. These unnecessary rendering tasks can also reduce the performance of the system.

Further note that a selection of which display elements will be included (and which ones will not be included) could be performed in a number of different ways. Moreover, different browsers may have different approaches to such selections. As a result, using different browsers may result in content being shown differently (e.g., a display might look or act differently when rendered by Internet Explorer® as compared to Firefox® because different calculations, considerations, and/or rules might be applied). Such inconsistencies may confuse or annoy a user.

Approaches that may improve the performance of systems that render user interface displays may be desired. Moreover, it may advantageous to provide a consistent user experience and to do so in an efficient and convenient manner.

DETAILED DESCRIPTION

Figure 1:
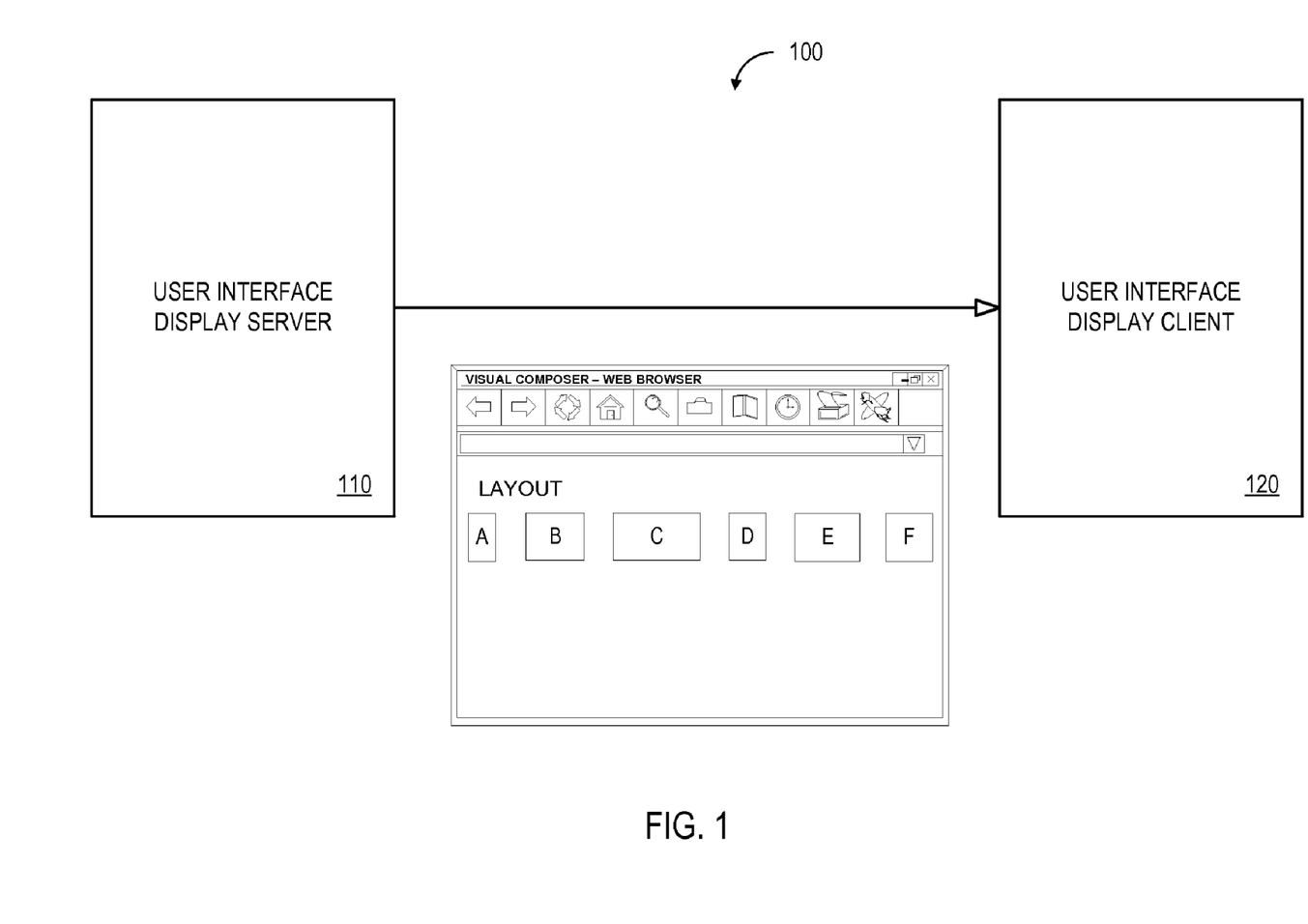
FIG. 1 is a block diagram of a system according to some embodiments of the present invention.

To address some of the problems described in the background section of this application, dynamic content layout systems, methods, and apparatus may be provided. For example, FIG. 1 is block diagram of a system 100 in accordance with some embodiments. In particular, a user interface display server 110 might transmit information to a user interface display client 120. For example, the sever 110 might transmit information about a web page to a remote client device 120 executing a browser application. As used herein, a device may be "remote" in that it is physically located distant from another device and/or in that it communicates with another device via one or more communication networks. The server 110 and client device 120 may then operate in accordance with any of the embodiments described herein.

According to some embodiments, the server 110 and/or client device 120 facilitate an automated layout of content for a user interface display. As used herein, the term "automated" indicates that at least some part of a step associated with a process or service is performed with little or no human intervention. By way of examples only, the client device 120 might automatically select appropriate display elements to be included on a user interface display. The client device 120 might be associated with a Personal Computer (PC), a notebook computer, a workstation, a wireless device, a wireless telephone, a set-top device, a television, a digital video recorder, a game platform, and/or a Personal Digital Assistant (PDA). The server 110 might be associated with, for example, a web server, a portal server, an enterprise application, and/or a database.

Any of the devices described in connection with the system 100 might, according to some embodiments, exchange information via a communication network. As used herein, devices (including those associated with the server 110 and client device 120) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, an Ethernet network, a wireless LAN network, and/or an Internet Protocol (IP) network such as the Internet, an intranet, or an extranet. Note that any devices described herein may communicate via one or more such communication networks.

The devices of FIG. 1 might, according to some embodiments, be accessible via a Graphical User Interface (GUI). The GUI might be associated with a web page or portal display and may be used, for example, to dynamically display and receive financial and/or business information associated with an enterprise.

Although a single server 110 and client device 120 are shown in FIG. 1, any number of such devices may be included. Moreover, various devices described herein might be combined or co-located according to embodiments of the present invention.

In some cases, the server 110 might transmit information about a user interface display (e.g., a web page) to the client device 120. Note, however, that different types of client devices 120 and/or web browser applications might not share a single control approach to handle user interface elements in web pages (e.g., user selectable tabs or buttons). That is, there might be no single service that manages the behavior of a page and its elements. As a result, using different browsers at client devices 120 could result in content being shown differently (e.g., a display might look or act differently when rendered by Internet Explorer® as compared to Firefox® because different calculations, considerations, and/or rules might be applied).

Figure 2:
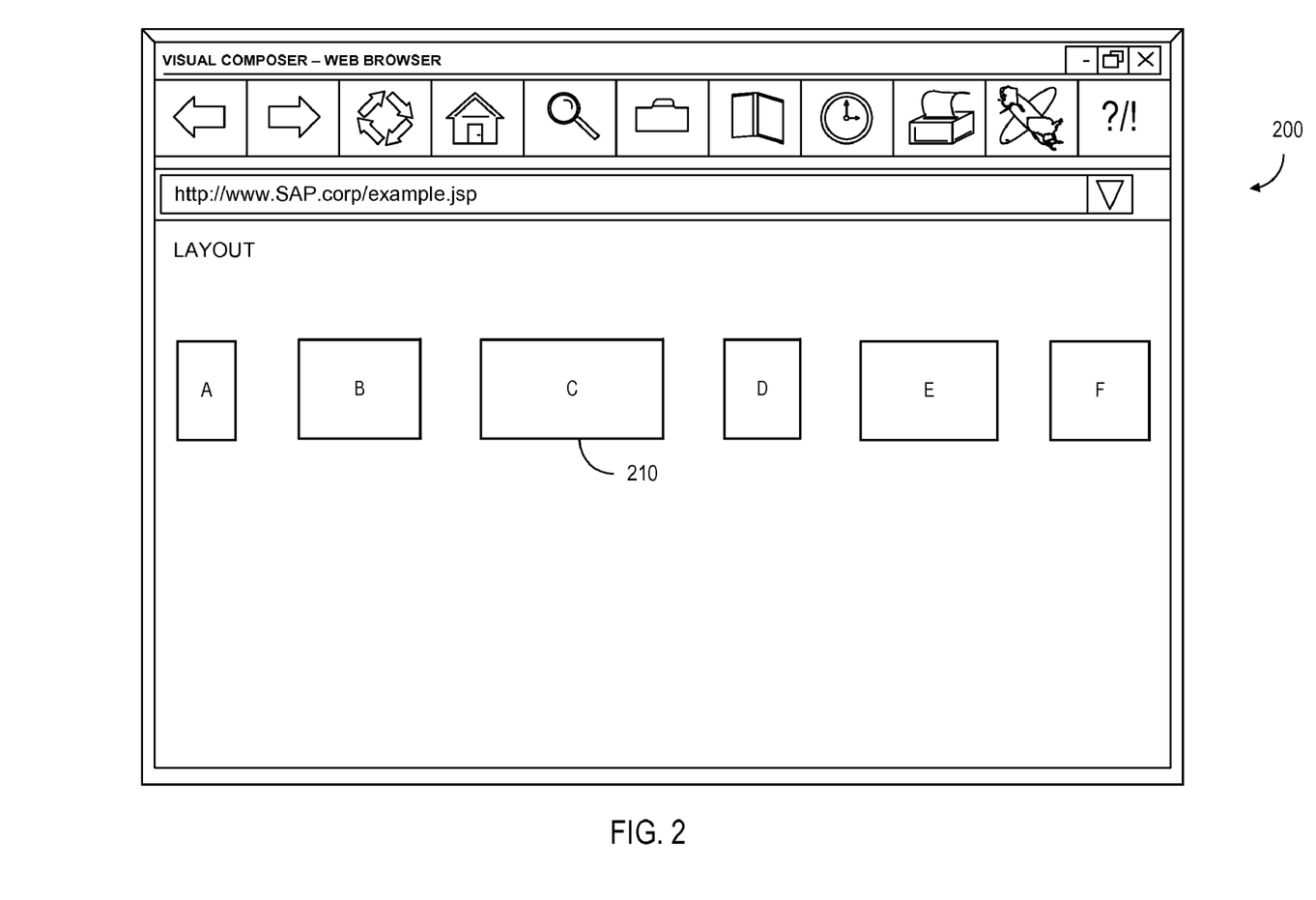
FIG. 2 illustrates a display having display elements in accordance with some embodiments.

Consider, for example, FIG. 2 which illustrates a full screen display 200 with a number of display elements 210 (elements A through F). Note, however, that a user might be allowed to re-size the browser window (or an applicable frame within the browser window) such that not all of the elements A through F will fit on the display. In this case, the client device 120 might need to determine which of the display elements 210 will be included in the newly sized display. Such a determination may be time consuming process that degrades the user experience.

To improve the performance of the system 100, the client device 120 may include a communication device (e.g., a communication port) to receive data from the server 110. The client device 120 may further include a processor coupled to the communication device and a storage device in communication with the processor storing instructions adapted to be executed by the processor to perform a method in accordance with any of the various embodiments described herein.

Figure 3:
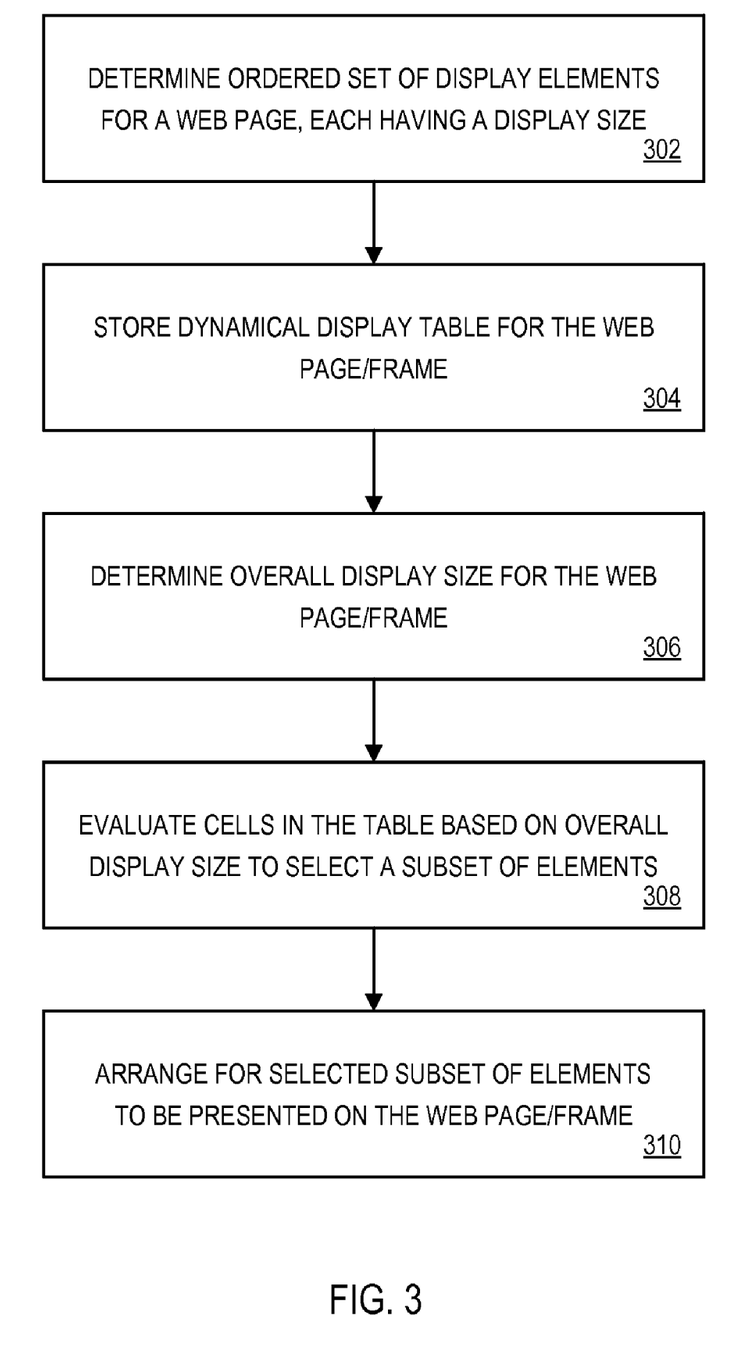
FIG. 3 is a method of facilitating presentation of a user interface display according to some embodiments.

For example, FIG. 3 illustrates one method that might be performed, for example, by the client device 120 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 302, an ordered set of display elements associated with a user interface display may be determined, and each display element may be associated with a display value. For example, an ordered set of user selectable tabs, icons, or buttons might be provided on a display, and each of those display elements could be associated with different widths (that is, the display value could represent a number of pixels, millimeters, or some other size-related value). Elements A through F of FIG. 2 are one example of an ordered set of display elements.

At 304, a dynamic display table may be generated and stored in connection with the user interface display, with each cell in the dynamic display table representing a pre-determined sub-set of the display elements and containing a total of the display values of the display elements in that sub-set. For example, a table cell might be associated with elements C, D, and E and include a value representing the total sum of display values for those three elements.

At 306, an overall display value associated with the user interface page may be determined. For example, overall width of a web browser window or frame might be determined after it is re-sized by a user, an application, or an operating system. A plurality of cells in the dynamic display table may then be automatically evaluated at 308 to select an appropriate sub-set of display elements based on the overall display value. It may then be arranged at 310 for the selected sub-set of display elements to be presented on the user interface display. For example, only elements B, C, and D might be selected and rendered in the example of FIG. 2.

Figure 4:
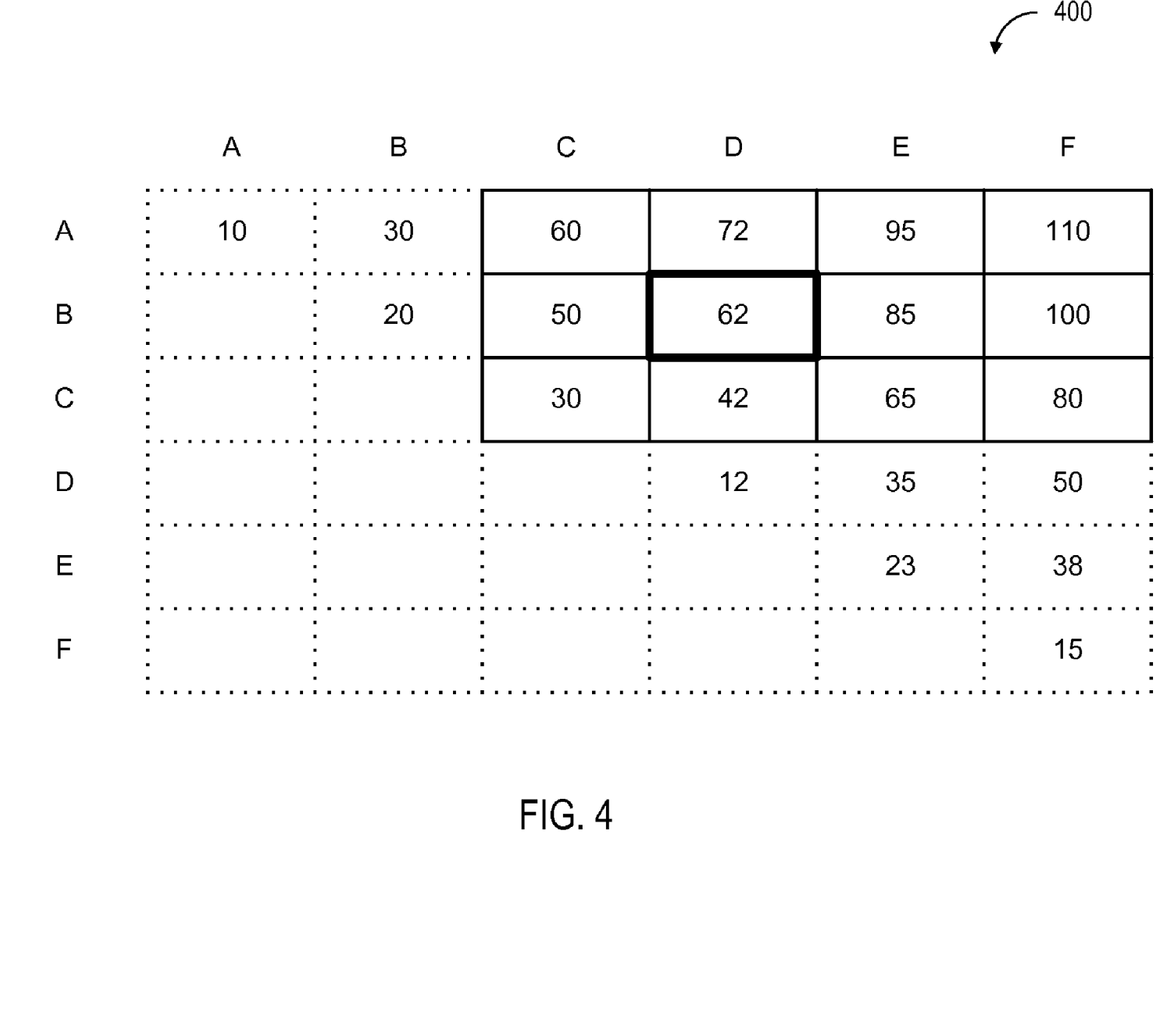
FIG. 4 is a dynamic display table according to some embodiments of the invention.

To facilitate understanding of some embodiments of the present invention, consider again the display 200 of FIG. 2 that includes elements A through F. Note that different elements are of different sizes, and, for this example, assume that the display elements have the following display unit widths: A=10, B=20, C=30, D=12, E=23, and F=15. In this case, FIG. 4 illustrates a dynamic display table 400 that might be generated and stored for such a set of display elements according to some embodiments of the invention. In particular, the table 400 includes six rows associated with elements A through F and six columns associated with elements A through F. A particular cell located at row x, column y is associated with a subset of display elements x through y, inclusive. That is, row C, column E is associated with the following subset of display elements: C, D, and E. Note that the table 400 might be built when a web page or frame is initially loaded. Moreover, the may be updated when elements are added to or removed from the display (e.g., the user might drag and drop an element out of a frame) by adding or deleting columns and rows as appropriate.

The value stored in each cell is the combined widths of the individual elements in the sub-set. For example, the value "65" stored in the cell at row C, column E equals the width of element C (30) plus the width of element D (12) plus the width of element E (23), or a total of 65 (e.g., pixels). Note that widths might or might not include spaces between the elements.

Figure 5:
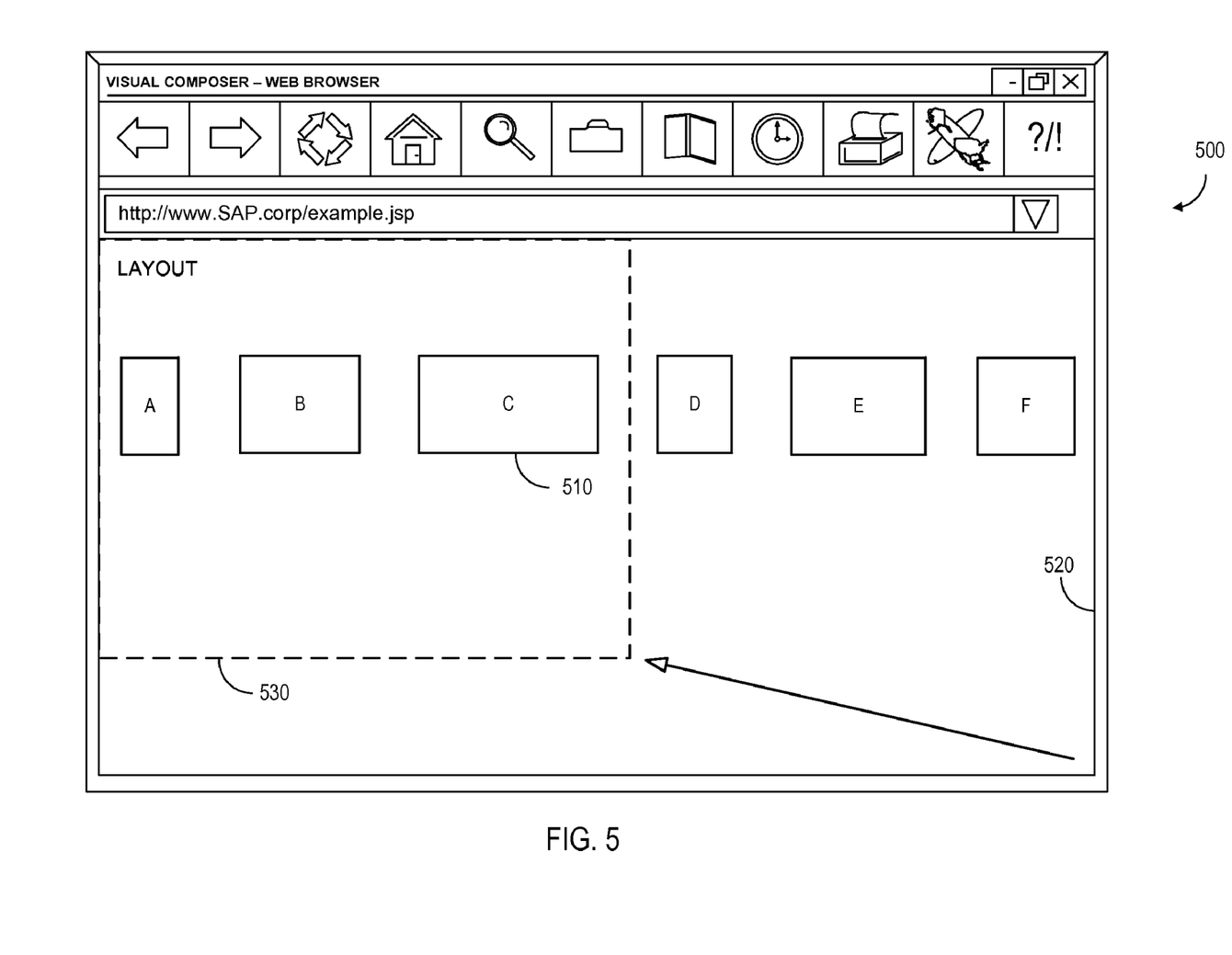
FIG. 5 illustrates a display prior to being re-sized according to some embodiments.

Consider now FIG. 5 illustrating a display 500 with elements 510 that fit within a current large area 520 (e.g., having a width of 140 display units). All six of the elements fit within the large area 520, but a user is about to reduce the current large area to a new smaller area 530 (illustrated by the arrow and dashed box in FIG. 5, and for this example will have a new width of 64 display units). Not all of the horizontally ordered set of display elements 510 will fit within the smaller area 530.

According to some embodiments, one of the display elements 510 may be given a higher priority when a sub-set of elements is selected. For example, a user might have previously selected element C, and thus the system may attempt to make sure that element C will still be displayed to the user even after he or she re-sizes the display 500. Thus, only cells in the table 400 that include element C (illustrated with non-dashed lines in FIG. 4) might be evaluated by the system.

Figure 6:
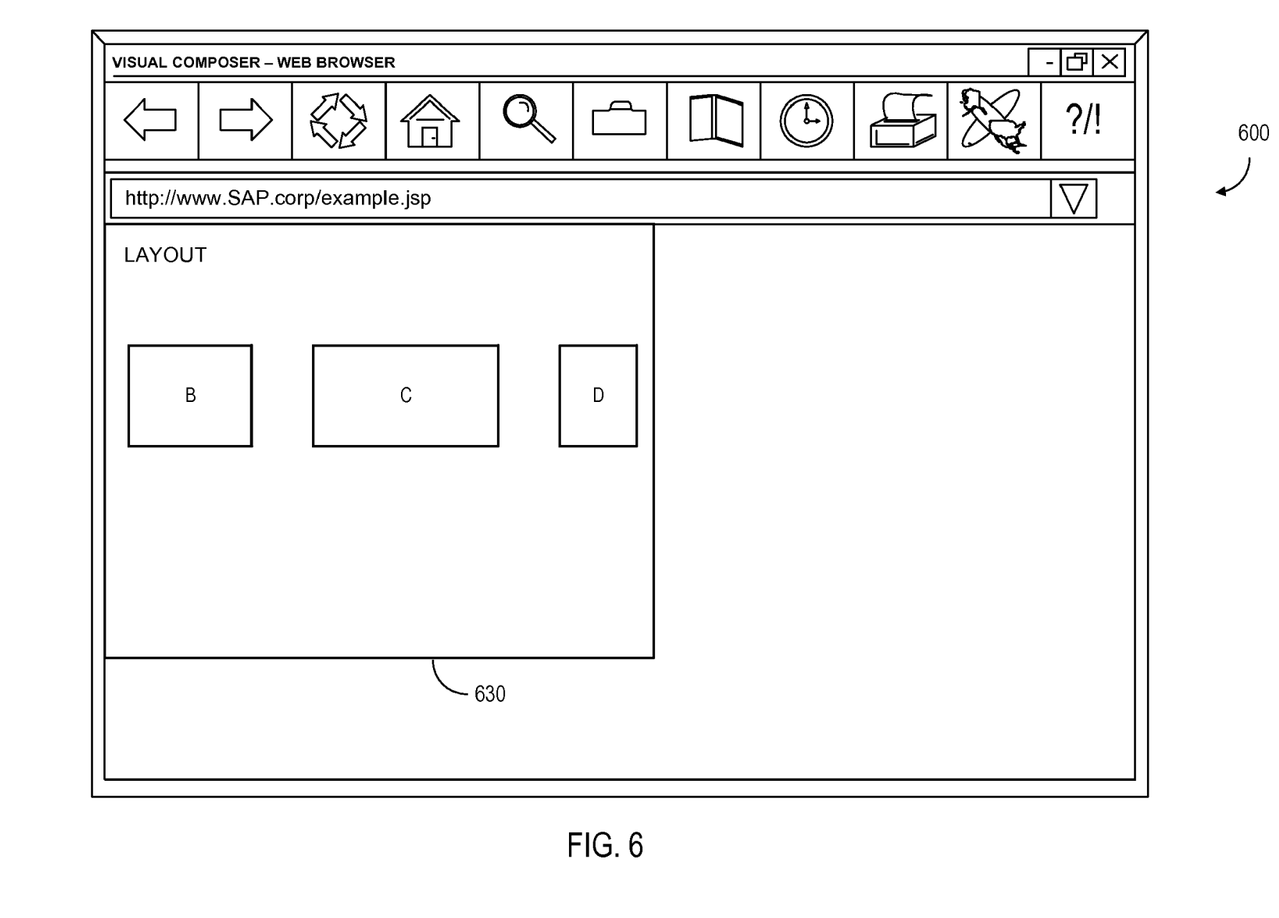
FIG. 6 illustrates a display after being re-sized according to some embodiments of the invention.

Note that the system may want to display the maximum number of display elements 510 possible (so long as element C is included in the sub-set). In this case, the appropriate cells in the dynamic display table 400 may be examined to determine which sub-set has the highest value that does not exceed the new display width (the new width being 64 display units). As a result, the cell at row B, column D is selected. That is, the selected sub-set of display elements will be B, C, and D. An example of a new display 600 having the reduced size area 630 is provided in FIG. 6.

In this way, some embodiments of the present invention may improve the performance of a system when a display size is changed and/or when display elements are added to or removed from the display (since a simple table look up can be used to select which display elements should be rendered). Moreover, the behavior of the user interface may be uniform across different situations. That is, a homogenous export of the browser layout may provide consistency in the look and feel of a user interface.

Figure 7:
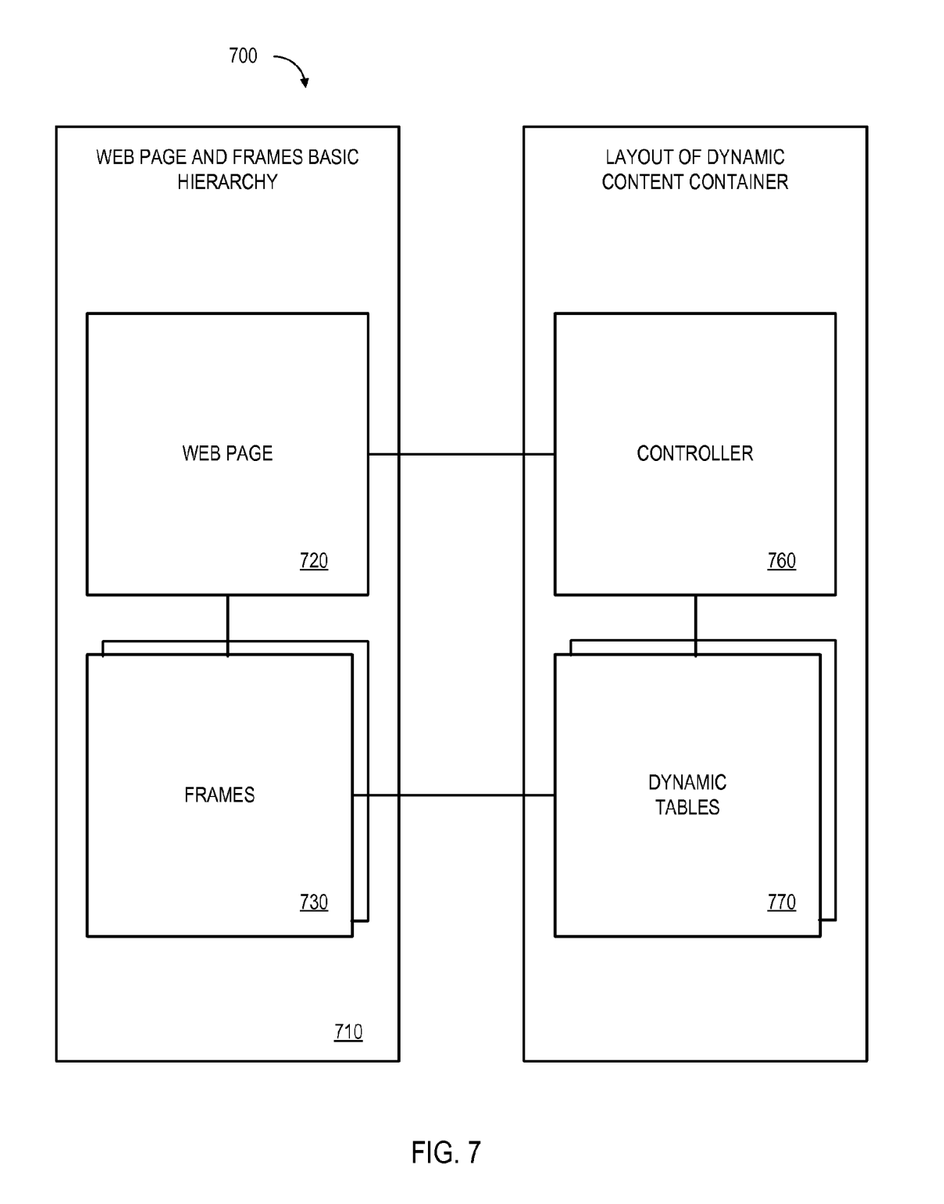
FIG. 7 is a block diagram of a system according to some embodiments of the present invention.

FIG. 7 is a block diagram of a system 700 according to some embodiments of the present invention. In particular, a basic hierarchy 710 may include a web page 720 (e.g., composed of several frames 730 and being associated with a single controller 760). Moreover, each frame 730 may be associated with collections of user interface elements and with a dynamic table object 770. The dynamic tables 770 may be, for example, objects that maintain all the data regarding the content of a frame 730 in a web page 720. The controller 760 may be, for example, an object that manages and controls the functionality, connection, and/or data transfer between several dynamic table objects 770. According to some embodiments, a table object 770 may be associated with an officer of the browser. Each user interface element that may by represented dynamically on the browser might behave according to the rules defined in the controller 760 that rely on information stored in the dynamic table object 770.

According to some embodiments, the dynamic table object 770 may contain details regarding the layout of the objects of a web page 720. This might be done, for example, using a table object 770 that stores all of the information associated with the elements that might potentially be rendered for a specific frame 730. For example, the table object 770 might store a width and height for each element of the frame 730. A single cell in the table object 770 might represent an ordered sub-set of side-by-side elements. When the user performs an action which needs a new calculation of the layout of the objects on the screen (or such a situation automatically arises without user action), the application may search the table and evaluate each cell for the most appropriate sub-set of objects given the new display size situation. According to some embodiments, the table object 770 may also be updated when a display element is removed from and/or added to the web page 720 or frame 730.

According to some embodiments, the searching and evaluating may be represented by:

$$M_{ij} = \sum_{k=i}^{j} f(a_k) \,\bigg|\, a_k \in A$$

where $M_{A1xlA1}$ comprises the dynamic display table and f represents a function to determine a display value of each display element (e.g., a width and/or height).

According to some embodiments the table object 770 may be passed as an attribute and/or, upon opening a new window the table object 700 may be sent as parameter to improve performance. Note that the table object 770 might be loaded with values on a first loading of a web page 720 and may be saved in a browser cache. Note that a table object 770 could potentially include more than two dimensions (e.g., with additional dimensions representing different aspects of information). According to some embodiments, a "template table" might be provided for different types of pages having similar elements with the same behavior and attributes. The template table may then be re-used several times for different pages. The system 700 might be implemented, for example, via one or more Application Programming Interfaces (APIs) and/or a software library that provides API for web developers. The API might, for example, be used to minimize the performance overhead associated with implementing and executing the system 700.

Such a system 700 may improve performance, for example, when a user scrolls through information in a browser window or frame. It may also be helpful when the user drags and/or drops display elements and/or when he or she re-sizes a window of a browser or a frame within a web page. Moreover, according to some embodiments, the system may consider the current resolution of the display screen, whether or not a display is currently rotated (e.g., by 180 degrees), and/or when a display is split or un-split by a user. The dynamic display table objects 770 might also be used to keep statistic information about each element or square and a history of related objects. For example, each square might contain a class which has information regarding the specific coordinate (e.g., width, height, depth, and/or statistic parameters). Note that a display table object 770 could include one or more "dummy" values used to reserve a portion of a display (that is, at least one cell in the dynamic display table may be associated with a non-visible display element).

Figure 8:
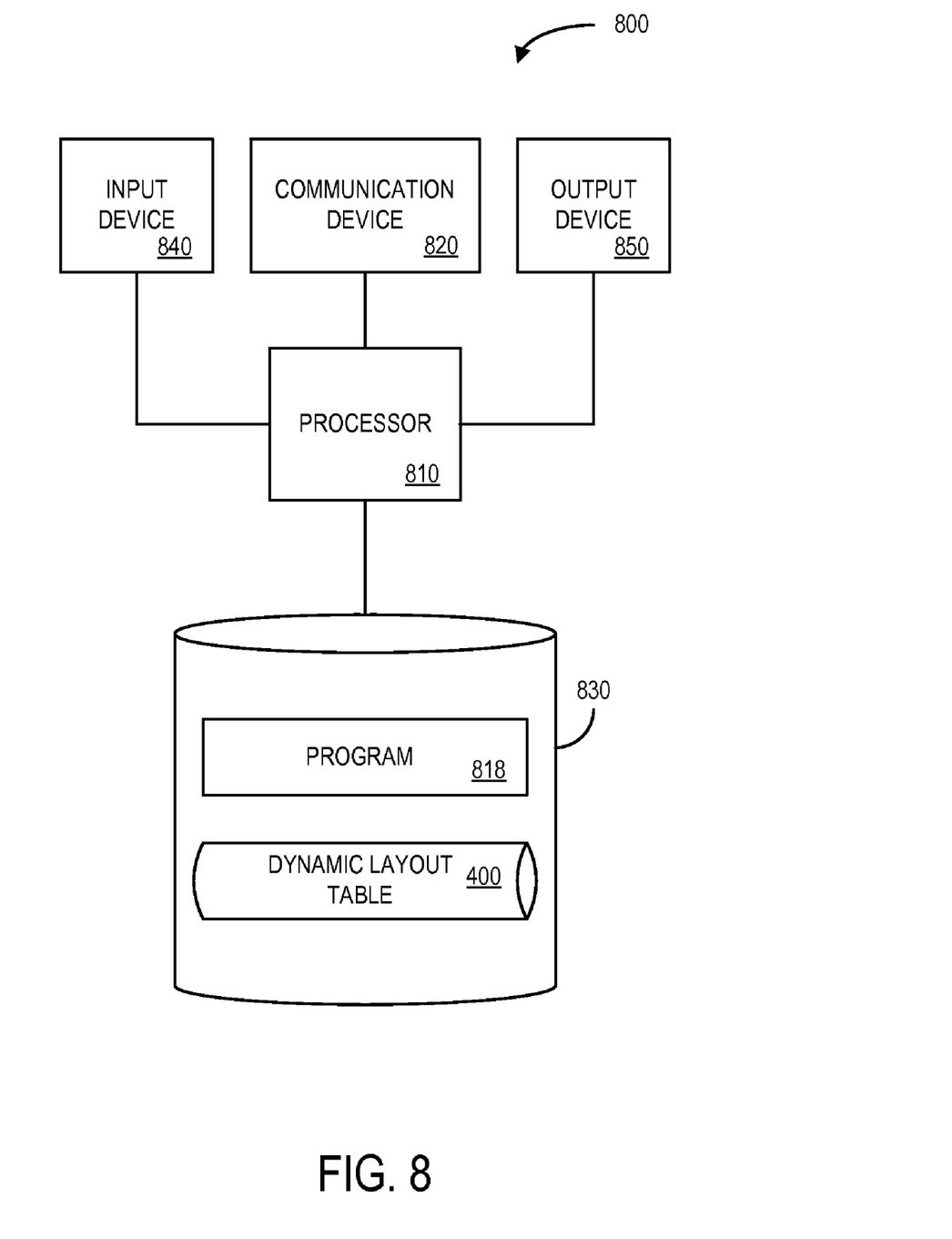
FIG. 8 is a block diagram of an apparatus in accordance with some embodiments.

FIG. 8 is a block diagram of an apparatus 800 in accordance with some embodiments of the present invention. The apparatus 800 might, for example, comprise a platform or engine associated with the client device illustrated in FIG. 1. The apparatus 800 includes a processor 810, such as one or more INTEL® Pentium® processors, coupled to a communication device 820 configured to communicate via a communication network (not shown in FIG. 8). The communication device 820 may be used to exchange information with a remote server.

The processor 810 is also in communication with an input device 840. The input device 840 may comprise, for example, a keyboard, a mouse, or computer media reader. Such an input device 840 may be used, for example, re-size or scroll a display window and/or to select or activate display elements within a window. The processor 810 is also in communication with an output device 850. The output device 850 may comprise, for example, a display screen or printer. Such an output device 850 may be used, for example, to provide a portal or web page to a user.

The processor 810 is also in communication with a storage device 830. The storage device 830 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices. The storage device 830 stores a program 815 for controlling the processor 810. The processor 810 performs instructions of the program 85, and thereby operates in accordance any embodiments of the present invention described herein. For example, the processor 810 may determine an ordered set of display elements for a user interface display, each display element being associated with a display value. The processor 810 may then create a dynamic display table for the display page, with each cell in the dynamic display table representing a sub-set of the display elements and containing a total of the display values of the display elements in that sub-set. An overall display value may be determined by the processor 810 for the user interface page, and a plurality of cells in the dynamic display table may be evaluated to select an appropriate sub-set of display elements based on the overall display value. It may then be arranged for the selected sub-set of display elements to be presented on the user interface display (e.g., via the output device 850).

As used herein, information may be "received" by or "transmitted" to, for example: (i) the apparatus 800 from other devices; or (ii) a software application or module within the apparatus 800 from another software application, module, or any other source.

As shown in FIG. 8, the storage device 830 also stores the dynamic layout table 400. One example of such a table 400 that may be used in connection with the apparatus 800 was described in detail with respect to FIG. 4. The illustration and accompanying description of the table presented herein is merely exemplary, and any number of other table and/or database arrangements could be employed besides those suggested by the figure. For example, different tables associated with different display values might be stored at the apparatus 800.

Thus, some embodiments may help solve problems associated with losing information (e.g., display elements) during a lifecycle of the web page. It may also reduce the heavy calculation associated with content layout for a browser, which can also cause information to be lost. Moreover, some embodiments are associated with techniques to help a browser select and display information relatively quickly without the need for heavy processing (and without losing data and important information of interest to a user).

Performance improvements for layout calculations of composite web pages during the lifecycle of the web page may be provided, for example, during navigation, resizing, opening new window, scrolling, dragging, and dropping. Embodiments might also provided relatively high granular events for showing and/or hiding elements on a page during an initial rendering, resizing, and/or scrolling for applications running on a web page. Moreover, some embodiments, may manage and/or control the behavior of all dynamic user interface elements according to predefined and consistent rules.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Figure 9:
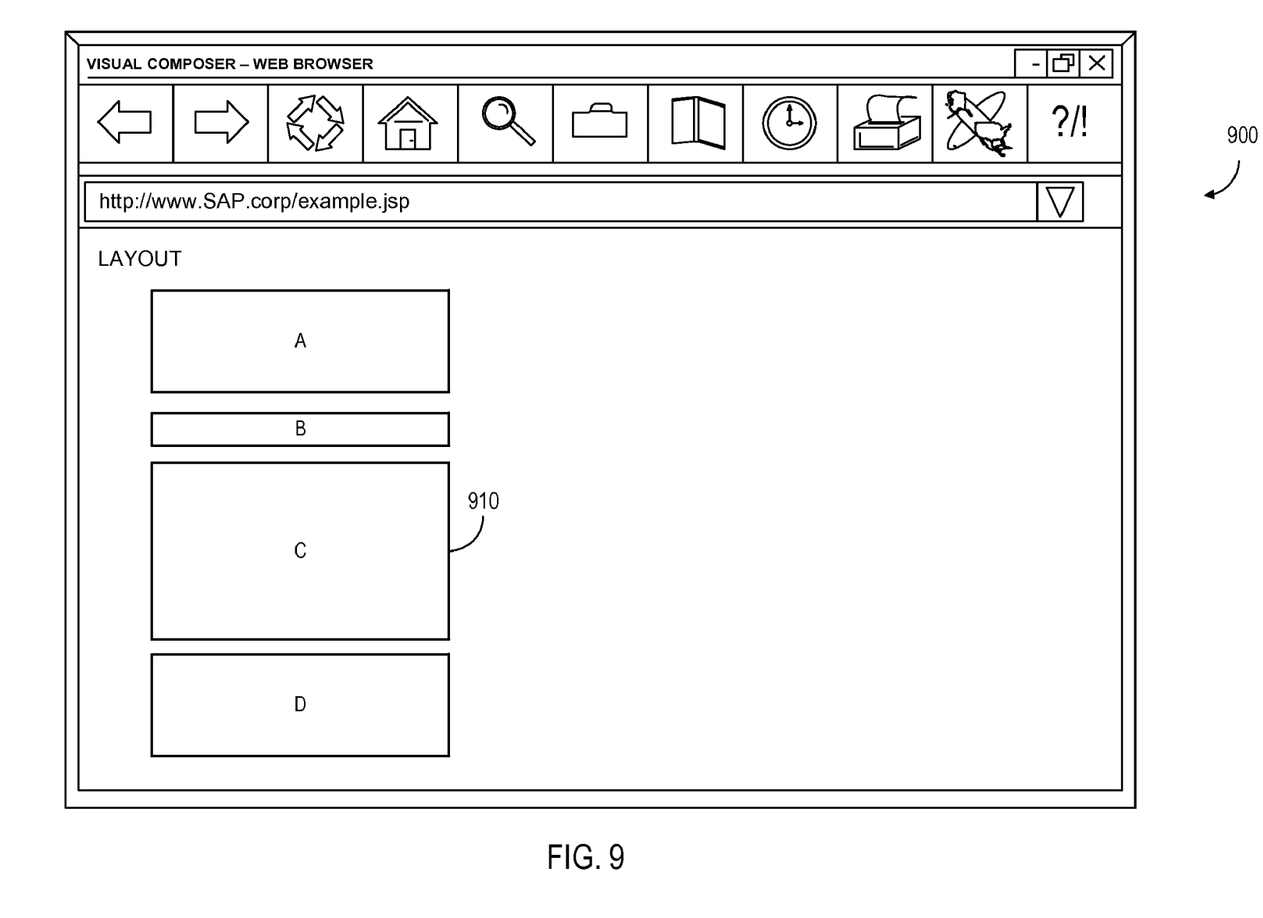
FIG. 9 illustrates a display having vertically arranged display elements in accordance with some embodiments.

For example, although embodiments have been described as being used to select a subset of horizontally ordered display elements, embodiments may be used with respect to other types and arrangements of objects. For example, FIG. 9 illustrates a display 900 having vertically arranged display elements 910 (elements A through D) in accordance with some embodiments. In this case, a dynamic table could store values representing total heights of various subsets of the display elements 910. Moreover, although particular types of user interface displays have been described, embodiments may be associated with any other type of display (e.g., the invention is not limited to web browser displays).

The several embodiments described herein are solely for the purpose of illustration. Persons skilled in the art will recognize from this description other embodiments may be practiced with modifications and alterations limited only by the claims.

What is claimed is:

1. A method associated with a user interface display, comprising:
    determining an ordered set of display elements associated with the user interface display, each display element being associated with a display value;
    storing a dynamic display table for a display page, each cell in the dynamic display table containing a total of the display values of the display elements in a sub-set, wherein a first cell of the dynamic display table is associated with a first display element and a second cell of the dynamic display table is associated with a second display element, and wherein the first cell comprises a display value associated the first element added to a display value associated with the second cell;
    determining an overall display value associated with a user interface page;
    automatically evaluating, by a processor, a plurality of cells in the dynamic display table to select an appropriate sub-set of display elements based on the overall display value; and
    arranging for the selected sub-set of display elements to be presented on the user interface display, wherein the dynamic display table is associated with a web browser controller and the dynamic display table is passed as an attribute when the user interface display is initially created.

2. The method of claim 1, wherein the display values are associated with at least one of: (i) display element widths, or (ii) display element heights.

3. The method of claim 1, wherein the user interface display comprises at least one of: (i) a web page, or (ii) a web page frame.

4. The method of claim 1, wherein the display elements are associated with at least one of: (i) user selectable tabs, or (ii) user selectable buttons.

5. The method of claim 1, wherein the dynamic display table is stored in a browser cache.

6. The method of claim 1, wherein a plurality of display values are stored in each cell of the dynamic display table.

7. The method of claim 1, wherein a first display element is designated as a priority display element and said evaluating is performed based on the priority display element.

8. The method of claim 1, further comprising:
    updating the dynamic display table based on: (i) a display element being removed from the user interface display, or (ii) a display element being added to the user interface display.

9. The method of claim 1, wherein at least one cell in the dynamic display table is associated with a non-visible display element.

10. A display system, comprising:
    a storage device storing a dynamic display table associated with an ordered set of display elements of a user interface display, each display element having a display value, wherein each cell in the dynamic display table contains a total of the display values of the display elements in a sub-set, wherein a first cell of the dynamic display table is associated with a first display element and a second cell of the dynamic display table is associated with a second display element, and wherein the first cell comprises a display value associated the first element added to a display value associated with the second cell;
    a controller to: (i) determine an overall display value associated with a user interface page, (ii) evaluate a plurality of cells in the dynamic display table to select an appropriate sub-set of display elements based on the overall display value, and (iii) arrange for the selected sub-set of display elements to be presented on the user interface display, wherein the dynamic display table is associated with a web browser controller and the dynamic display table is passed as an attribute when the user interface display is initially created.

11. The display system of claim 10, wherein the display values are associated with at least one of: (i) display element widths, or (ii) display element heights.

12. The display system of claim 10, wherein the user interface display comprises at least one of: (i) a web page, or (ii) a web page frame.

13. The display system of claim 10, wherein the display elements are associated with at least one of: (i) user selectable tabs, or (ii) user selectable buttons.

14. A computer-readable non-transitory storage medium storing processor-executable process steps associated with a web page, the process steps comprising:
    determining an ordered set of user interlace elements associated with the web page, each user interface element being associated with a display size;

storing a display table for a display page, each cell in the display table containing a total of the display sizes of the user interface elements in a sub-set, wherein a first cell of the display table is associated with a first display element and a second cell of the display table is associated with a second display element, and wherein the first cell comprises a display value associated the first element added to a display value associated with the second cell;

determining an overall display size associated with a user interface page;

evaluating a plurality of cells in the display table to select an appropriate sub-set of user interface elements based on the overall display size; and arranging for the selected sub-set of user interface elements to be presented on the web page, wherein the display table is associated with a web browser controller and the display table is passed as an attribute when the user interface display is initially rendered.

15. The medium of claim 14, wherein the display table is stored in a browser cache.

* * * * *